3,452,081
Patented June 24, 1969

3,452,081
PHENOXY SUBSTITUTED 2-ALKENOIC ACIDS
James M. Sprague, Gwynedd Valley, and William A. Bolhofer, Frederick, Pa., assignors to Merck & Co., Inc., Rahway, N.J., a corporation of New Jersey
No Drawing. Filed May 27, 1965, Ser. No. 459,461
Int. Cl. C07c 69/76, 65/02
U.S. Cl. 260—473           9 Claims

ABSTRACT OF THE DISCLOSURE 4-phenoxy-2-alkenoic acid products wherein the phenoxy radical is attached to a tertiary carbon of the alkenoic acid chain and wherein the phenoxy ring may be optionally substituted by one or more nuclear substituents as, for example, by halogen, lower alkyl, trihalomethyl, etc. The products are hypocholesterolemic agents which effectively reduce the concentration of cholesterol and other lipids in blood serum.

The products are obtained by treating a 2-phenoxyalkanal with alkoxycarbonylalkylidenetriarylphosphorane or with a trialkylphosphonoalkanoate followed by hydrolysis of the esterified intermediate thus formed to the desired carboxylic acid.

---

This invention relates to a new class of phenoxy substituted 2-alkenoic acids and to the nontoxic, pharmacologically acceptable aci d addition salts, esters and amide derivatives thereof which have valuable hypocholesterolemic activity and which are thus useful in the treatment of atherosclerosis.

Clinical studies show that cholesterol apparently plays a major role in the formation of atherosclerotic plaques by accelerating the deposition of blood lipids in the arterial wall. It is the purpose of this invention to disclose a new class of chemical compounds which effectively reduce the concentration of cholesterol and other lipids in blood serum and thus ameliorate the condition usually associated with blood lipid deposition.

The phenoxy substituted 2-alkenoic acids of the invention are products having the following general formula:

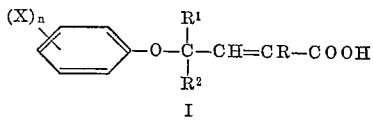

I wherein R is hydrogen or lower alkyl, for example, methyl, etc.; $R^1$ and $R^2$ represent similar and dissimilar lower alkyl radicals, for example, methyl, ethyl, propyl, etc.; X is a member selected from the group consisting of hydrogen, halogen, for example, chlorine, bromine, fluorine, etc., lower alkyl, for example, methyl, ethyl, etc., halolower alkyl, for example, trihalomethyl such as trifluoromethyl, etc., cycloalkyl, for example, mononuclear cycloalkyl containing five to six nuclear carbon atoms such as cyclopentyl, cyclohexyl, etc., lower alkoxy, for example, methoxy, ethoxy, etc., lower alkylthio, for example, methylthio, ethylthio, etc., aryl, for example, phenyl, tolyl, xylyl, etc., aralkyl, for example, benzyl, phenethyl, etc., aryloxy, for example, phenoxy, etc., aralkoxy, for example, benzyloxy, etc., alkenyl, for example, lower alkenyl such as vinyl, allyl, etc., aralkenyl, for example, styryl, etc., and, taken together, two X radicals on adjacent carbon atoms of the benzene ring may be combined to form an hydrocarbylene chain (i.e., a divalent organic radical composed solely of carbon and hydrogen) containing from three to four carbon atoms between their points of attachment, for example, 1,3-butadienylene (i.e.,

—CH=CH—CH=CH—)

etc. and $n$ is an integer having a value of 1–3.

This invention also relates to the acid addition salts of the instant phenoxy substituted 2-alkenoic acids, which salts are prepared by the reaction of the said acids with a base having a nontoxic, pharmacologically acceptable cation. In general, any base which will form an acid addition salt with a carboxylic acid and whose pharmacological properties will not cause an adverse physiological effect when ingested by the body system is considered as being within the scope of this invention. Suitable bases thus include, for example, the alkali metal and alkaline earth metal hydroxides, carbonates, etc., ammonia, primary, secondary and tertiary amines, such as monoalkylamines, dialkylamines, trialkylamines, nitrogen containing heterocyclic amines, for example, piperidine, etc. The acid addition salts thus produced are the functional equivalent of the corresponding phenoxy substituted 2-alkenoic acid products and one skilled in the art will appreciate that, to the extent that the acids of the invention are useful in therapy, the variety of acid addition salts embraced by this invention are limited only by the criterion that the bases employed in forming the salts be both nontoxic and physiologically acceptable.

This invention also relates to the ester and amide derivatives of the instant products, which derivatives are prepared by conventional methods well-known to those skilled in the art. Thus, for example, the ester derivatives may be prepared by the reaction of a phenoxy substituted 2-alkenoic acid of this invention with an alcohol as, for example, with a lower alkanol, a di-lower alkylaminoalkanol such as dimethylaminoethanol, or with an heterocyclic substituted lower alkanol such as 3-hydroxymethylpyridine, etc. or, alternatively, the phenoxy substituted 2-alkenoic acid may be converted to its acid halide by conventional methods and the acid halide thus formed may be reacted with the lower alkanol, di-lower alkylaminoalkanol, 3-hydroxymethylpiperidine, etc. Also, the desired ester derivatives of this invention may be prepared inherently by employing, in the process hereinafter disclosed for the preparation of the instant products, the appropriate ester of the phenoxy substituted 2-alkenoic acid reactant. The amide derivatives of the instant phenoxy substituted 2-alkenoic acids may be prepared by treating the acid halide of the said acids with ammonia, an appropriate mono- or dialkylamine, hydrazine, guanidine, etc., to produce the corresponding amide. Still another method for preparing the said amide derivatives consists in the conversion of an ester derivative of a phenoxy substituted 2-alkenoic acid to its corresponding amide by treating the said ester with ammonia or with an appropriate monoalkylamine, dialkylamine, hydrazine, guanidine, etc. to produce the corresponding amide compound. These and other equivalent methods for the preparation of the ester and amide derivatives of the instant products will be apparent to one having ordinary skill in the art and to the extent that the said derivatives are both nontoxic and physiologically acceptable to the body system the said esters and amides are the functional equivalent of the corresponding phenoxy substituted 2-alkenoic acids.

A preferred sub-group of compounds according to this invention are the phenoxy substituted 2-alkenoic acids having the following general formula:

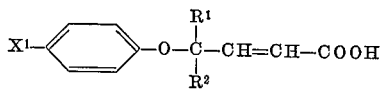

wherein $R^1$ and $R^2$ represent similar and dissimilar lower alkyl radicals, for example, methyl, etc. and $X^1$ is halogen, for example, chlorine, etc. Also includes within the preferred embodiment are the nontoxic, pharmacologically acceptable acid addition salts, esters and amide derivatives of the phenoxy substituted 2-alkenoic acid products described above; for example, the alkali metal and alkaline earth metal salts thereof such as the sodium, potassium or calcium salts; the lower alkyl, di-lower alkylaminoalkyl and 3-pyridylmethyl esters thereof, and the corresponding amide derivatives of the above-described products, for example, the amido, mono-lower alkylamido, di-lower alkylamido, hydrazide, guanidide, etc., derivatives thereof such as the amide derivatives derived from ammonia, methylamine, dimethylamine, ethylamine, diethylamine, etc., hydrazine, guanidine, etc.

The products of the invention are conveniently prepared from their corresponding nuclear substituted 2-phenoxyalkanal precursors by the treatment thereof with an alkoxycarbonylalkylidenetriarylphosphorane or with a trialkylphosphonoalkanoate, followed by the hydrolysis of the esterified intermediate thus formed to the desired acid (I). Suitable reagents which may be used in the process include, for example, the lower alkoxycarbonylalkylidenetriphenylphosphoranes, etc. and the tri-lower alkylphosphonoacetates (and 2-propionates, etc.) and the homologous derivatives thereof. The reaction may be conducted in any solvent in which the reactants are reasonably soluble and which is reasonably inert with respect to the starting materials employed; however, ethylene glycol dimethyl ether and benzene have proved to be particularly suitable reaction mediums and are the solvents of choice for the instant process. If desired, a catalyst may be used to facilitate the reaction. When, for example, the starting material employed is an alkoxycarbonylalkylidenetriarylphosphorane, benzoic acid has proved to be a particularly effective catalytic reagent. The following equation illustrates the process:

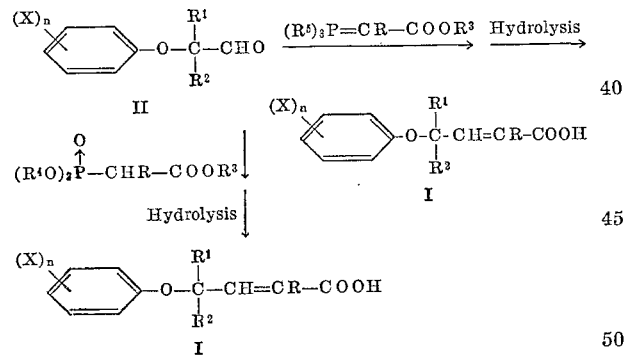

wherein the radicals R, $R^1$, $R^2$, X and $n$ are as defined above; $R^3$ and $R^4$ are lower alkyl radicals, for example, ethyl, etc. and $R^5$ is mononuclear aryl, for example, phenyl. The hydrolysis step in the foregoing equation is carried out in the conventional manner as, for example, by treating the esterified intermediate with an aqueous solution of a base such as an aqueous solution of sodium hydroxide or sodium carbonate, and then with an acid such as hydrochloric acid.

The products of the invention are generally obtained as crystalline solids and, if desired, may be purified by recrystallization from an hydrocarbon solvent such as cyclohexane, etc.

The phosphoranes and phosphonoalkanoates which are employed as starting materials in the foregoing reaction with the 2-phenoxyalkanal reactants (II) are either known compounds or may be prepared by methods known to those skilled in the art. Thus, for example, by treating a suitable alkyl 2-haloalkanoate such as ethyl 2-bromoacetate, ethyl 2-bromopropionate, methyl 2-bromopropionate, etc., with a suitable trialkylphosphite the corresponding trialkylphosphonoalkanoate is obtained. The reaction is preferably conducted at raised temperatures for extended periods as, for example, at temperatures in the range of 130–190° C. for up to four hours. The alkoxycarbonylalkylidenetriarylphosphorane derivatives are also obtained from suitable alkyl 2-haloalkanoates by the treatment thereof with a triarylphosphine, followed by the reaction of the phosphonium salt thus formed with an aqueous solution of a base as, for example, with a dilute solution of sodium hydroxide. Again, the reaction is favored by the application of slight heating. The following equation illustrates the preparation of the phosphorane and phosphonoalkanoate starting materials:

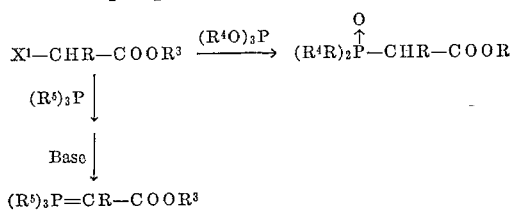

wherein R, $R^3$, $R^4$, $R^5$ and $X^1$ are as defined above.

The 2-phenoxy substituted alkanals (II) which are also employed as starting materials in the process of the invention are prepared from their corresponding 2-phenoxyalkanoic acids (III) by treatment of the latter with lithium aluminum hydride and anhydrous ethyl ether, followed by the oxidation of the 2-phenoxyalkanol compound (IV, infra) thus formed to the desired aldehyde. A mixture of dicyclohexylcarbodiimide and anhydrous dimethyl sulfoxide is a most suitable oxidation reagent with which to convert the alkanol intermediate (IV) to the desired alkanal (II) but it will be apparent to those skilled in the art that any one of a wide variety of other oxidizing agents may also be employed in an analogous manner with similar results. The following equation illustrates this method of preparation:

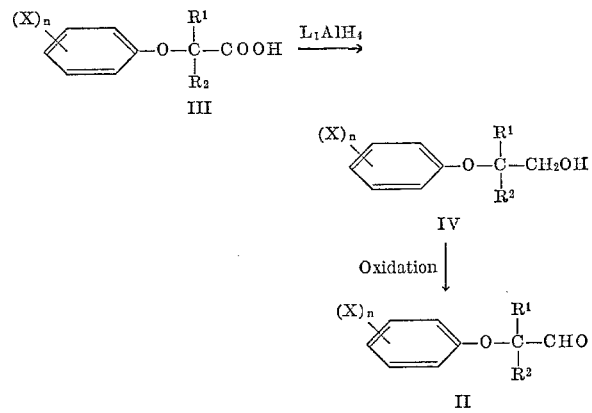

wherein $R^1$, $R^2$, X and $n$ are as defined above.

There is no clear agreement about the actual role of cholesterol synthesis in the localization of atherosclerotic plaques but numerous studies support the concept that cholesterol plays a major role in the pathogenesis of atherosclerosis because along with other lipids and fibrin it is the substance that accumulates in the arterial intima and subintima and produces arterial corrosion.

Since cholesterol is present to some extent in all ordinary diets and since it is also synthesized by various body organs from intermediates of metabolic origin, the development of some chemotherapeutic agent which will induce a significant reduction in the serum cholesterol level has been found desirable. In a search for such chemotherapeutic agents the products of the invention have been tested and found to exhibit surprisingly good hypocholesterolemic activity and these may be administered alone or in combination with other chemotherapeutic agents in dosage unit form and in admixture with a pharmaceutical carrier.

The following examples are illustrative of the phenoxy substituted alkenoic acids of the invention and the method by which they may be prepared. The examples are illustrative only and the invention should not be construed as being limited thereto.

EXAMPLE 1

4-(4-chlorophenoxy)-4-methyl-2-pentenoic acid

Step A.—Ethyl 4-(4-chlorophenoxy)-4-methyl-2-pentenoate: To a suspension of sodium hydride (4.8 g., 0.1 mole) in glycol dimethyl ether (150 ml.) there is added, dropwise, a solution of triethylphosphonoacetate (22.42 g., 0.1 mole) in glycol dimethyl ether (25 ml.). The mixture is stirred for one hour and then there is added dropwise at 25° C. a solution of 2-(4-chlorophenoxy)-2-methylpropionaldehyde (19.87 g., 0.1 mole) in glycol dimethyl ether (25 ml.). A tan gum precipitates at once. The mixture is kept for 16 hours at 20° C. The supernatant solution then is decanted and water (25 ml.) is added to it cautiously to decompose any excess sodium hydride. The solvent is removed at reduced pressure and the residue is acidified with 3 N hydrochloric acid at a temperature of 20° C. or less. The mixture then is extracted with ether and the ether extract is washed with 5% sodium hydroxide and with water and dried over magnesium sulfate. The solvent is removed at reduced pressure on a steam bath to yield 21.70 g. (80.7%) of ethyl 4-(4-chlorophenoxy)-4-methyl-2-pentenoate.

Step B.—4-(4-chlorophenoxy)-4-methyl-2-pentenoic acid: Water (2 ml.) and then methanol (50 ml.) are added to solid potassium hydroxide (4 g., 0.07 mole). A solution of ethyl 4-(4-chlorophenoxy)-4-methyl-2-pentenoate (13.4 g., 0.05 mole) in methanol (25 ml.) is added to the methanolic potassium hydroxide solution. The mixture is refluxed for one hour, the methanol is evaporated and the residue dissolved in water. The aqueous solution then is extracted with ether, the ether discarded and the aqueous layer acidified with hydrochloric acid whereupon an oil separates. After 24 hours the supernatant aqueous phase is decanted from the oil. After 16 additional hours a waxy solid forms which is freed from oil by suction filtration. The solid (9.6 g.) then is crystallized from cyclohexane (20 ml.) to yield 6.3 g. of product, M.P. 69–72° C.

After an additional crystallization from cyclohexane there is obtained 4.5 g. of 4-(4-chlorophenoxy)-4-methyl-2-pentenoic acid, M.P. 72–74° C.

Analysis.—Calculated for $C_{12}H_{13}ClO_3$: C, 59.87; H, 5.44; Cl, 14.74. Found: C, 60.16; H, 5.61; Cl, 14.53.

EXAMPLE 2

4-(4-chlorophenoxy)-4-methyl-2-pentenoic acid

Ethyl triphenylphosphoranylideneacetate (17.0 g., 0.05 mole) is dissolved in boiling dry benzene (100 ml.) and benzoic acid (1.5 g.) is added as catalyst. 2-(4-chlorophenoxy)-2-methylpropionaldehyde (9.9 g., 0.05 mole) is added and the mixture is stirred and refluxed for five hours. The benzene then is evaporated and the residue cooled and triturated with ether. The insoluble triphenylphenoxide is removed by filtration and washed with additional ether. The combined ether extracts are washed with 10% sodium bicarbonate to remove the benzoic acid previously added as catalyst. The ether then is evaporated and the semisolid residue is added to a solution of potassium hydroxide (4 g.) in water (2 ml.) and methanol (75 ml.). The mixture is refluxed for one hour and the methanol is evaporated. The residue is dissolved in water (150 ml.) and the solution kept for one hour, during which time a precipitate [i.e., residual $(C_6H_5)_3P=O$] forms. The precipitate is removed by filtration and the filtrate is extracted with ether. The aqueous layer then is acidified with hydrochloric acid, decanted from the semisolid precipitate which forms and then kept in an open vessel for 16 hours, during which time the oily solution changes to a waxy solid. The product is freed of oil on a suction filter and the solid (9.6 g.) dissolved in hot cyclohexane (20 ml.). The solution is cooled slowly to 10° C. and the solid is collected and again crystallized from cyclohexane (25 ml.) to obtain 4.5 g. of 4-(4-chlorophenoxy)-4-methyl-2-pentenoic acid, M.P. 72–74° C.

By substituting the appropriate 2-phenoxyalkanal and trialkylphosphonoacetate for the 2-(4-chlorophenoxy)-2-methylpropionaldehyde and triethylphosphonoactate of Example 1, Step A, and following substantially the procedure described in Steps A and B of that example all of the phenoxy substituted 2-alkenoic acids of the invention may be prepared. The following equation illustrates the reaction of Example 1, Steps A and B, and accompanying table depicts the 2-phenoxyalkanal and trialkylphosphonoacetate reactants of the process and the corresponding phenoxy substituted 2-alkenoic acid products (I) produced thereby:

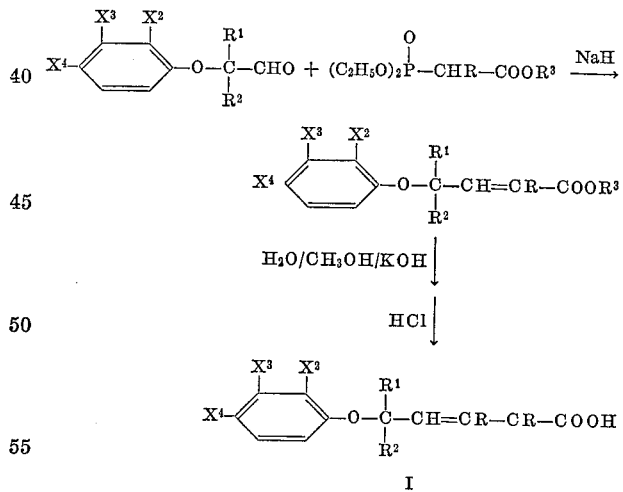

TABLE

| Ex. | R | R¹ | R² | R³ | X² | X³ | X⁴ |
|---|---|---|---|---|---|---|---|
| 3 | H | —CH₃ | —CH₃ | CH₃ | H | —CF₃ | H |
| 4 | —CH₃ | —CH₃ | —CH₃ | —C₂H₅ | H | H | —CH₃ |
| 5 | H | —CH₃ | —C₂H₅ | —CH₃ | H | H | —OCH₃ |
| 6 | —CH₃ | —CH₃ | —CH₃ | —C₂H₅ | —C₆H₅ | H | H |
| 7 | —CH₃ | —C₂H₅ | —CH₃ | —CH₃ | —CH₂—C₆H₅ | H | H |
| 8 | H | —C₃H₇ | —CH₃ | —CH₃ | H | H | —O—C₆H₅ |
| 9 | —CH₃ | —CH₃ | —C₂H₅ | —C₂H₇ | —O—CH₂—C₆H₅ | H | H |

TABLE—Continued

| Ex. | R | R¹ | R² | R³ | X² | X³ | X⁴ |
|---|---|---|---|---|---|---|---|
| 01 | —CH₃ | —C₂H₅ | —C₂H₅ | —C₂H₅ | H | Cl | H |
| 11 | H | —C₂H₅ | —CH₃ | —C₂H₅ | —CH=CH₂ | H | H |
| 12 | H | —CH₃ | —CH₃ | —CH₃ | Cl | H | Cl |
| 13 | H | —CH₃ | —CH₃ | —C₂H₅ | H | —CH₃ | Cl |
| 14 | —CH₃ | —CH₃ | —C₂H₅ | —CH₃ | H | H | Cl |
| 15 | —CH₃ | —C₂H₇ | —C₃H₇ | —CH₃ | H | H | Cl |
| 16 | H | —CH₃ | —CH₃ | —C₂H₅ | H | H | —O—CH₂— |
| 17 | —CH₃ | —CH₃ | —CH₃ | —CH₃ | —CH=CH—CH=CH— | | H |
| 18 | —CH₃ | —C₃H₇ | —CH₃ | —C₂H₅ | H | H | —CH=CH— |
| 19 | H | —CH₃ | —CH₃ | —C₄H₉ | H | H |  |
| 20 | H | —CH₃ | —C₃H₇ | —CH₃ | —SCH₃ | H | H |
| 21 | —CH₃ | —CH₃ | —CH₃ | —C₂H₅ | —CH₃ | H | —CH₃ |
| 22 | —CH₃ | —CH₃ | —CH₃ | —CH₃ | —OCH₃ | H | —CH₂—CH=CH₂ |
| 23 | H | —CH₃ | —CH₃ | —C₃H₇ | —OCH₃ | H | —CH=CH—CH₃ |
| 24 | —CH₃ | —CH₃ | —CH₃ | —C₂H₅ | H | —CH₃ | —CH₃ |
| 25 | H | —CH₃ | —CH₃ | —CH₃ | Cl | Cl | Cl |
| 26 | —CH₃ | —CH₃ | —CH₃ | —CH₃ | H | H | —CH=CH— |

The products of the invention can be administered in therapeutic dosages in conventional vehicles as, for example, by oral administration in the form of a tablet as well as by intravenous injection. Also, the dosage of the product may be varied over a wide range as, for example, in the form of scored tablets containing 25, 50, 100, 150, 250 and 500 milligrams of the active ingredients for the symptomatic adjustment of the dosage to the patient to be treated. These dosages are well below the toxic or lethal dose of the products.

A suitable unit dosage form of the products of this invention can be prepared by mixing 50 mg. of a phenoxy-2-alkenoic acid or a suitable acid addition salt, ester or amide derivative thereof, with 150 mg. of lactose and placing the 200 mg. mixture into a No. 3 gelatin capsule. Similarly, by employing more of the active ingredient and less lactose other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well-known to pharmacists.

It is also within the scope of this invention to combine two or more of the compounds of this invention in a unit dosage form or to combine one or more of the compounds with other known hypocholesterolemics or with other desired therapeutics and/or nutritive agents in dosage unit form.

The following example is included to illustrate the preparation of a representative dosage form:

EXAMPLE 27

Dry-filled capsules containing 500 mg. of active ingredient per capsule

| | Per capsule Mg. |
|---|---|
| 4-(4-chlorophenoxy)-4-methyl-2-pentenoic acid | 500 |
| Lactose | 400 |
| Magnesium stearate | 6 |
| Capsule size No. 00 | 650 |

The 4 - (4-chlorophenoxy) - 4 - methyl - 2 - pentenoic actid is reduced to a No. 60 powder and then lactose and magnesium stearate are passed through a No. 60 bolting cloth onto the powder and the combined ingredients admixed for 10 minutes and then filled into No. 00 dry gelatin capsules.

Similar dry-filled capsules can be prepared by replacing the active ingredient of the above example by any of the other novel compounds of this invention.

In addition to their utility in effecting a decrease in the concentration of blood cholesterol, it also has been found that the instant phenoxy-2-alkenoic acids (I) of the invention are useful as chemical intermediates inasmuch as they may be reduced to their corresponding phenoxy substituted alkanoic acid derivatives by catalytic hydrogenation. The said 2-phenoxyalkanoic acids also protect against induced hypocholesterolemia by effecting a decrease in the concentration of cholesterol in blood serum.

We claim:

1. A member selected from the group consisting of a compound of the formula:

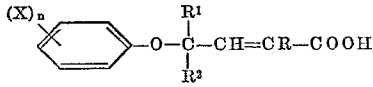

wherein R is hydrogen or lower alkyl; R¹ or R² represent similar and dissimilar lower alkyl radicals; X is a member selected from the group consisting of hydrogen, halogen, lower alkyl, trihalomethyl, cyclopentyl, cyclohexyl, lower alkoxy, lower alkylthio, phenyl, tolyl, xylyl, phenalkyl, phenoxy, phenalkoxy, lower alkenyl, phenalkenyl and, taken together, two X radicals on adjacent carbon atoms of the benzene ring may be combined to form a 1,3-butadienylene chain and n in an integer having a value of one to three; and the nontoxic, pharmacologically acceptable acid addition salts, lower alkyl esters, di-lower alkylamino lower alkyl esters, pyridylmethyl esters, amide, mono-lower alkylamide, di-lower alkylamide, hydrazide and guanidide derivatives thereof.

2. A compound of the formula:

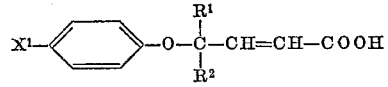

wherein R¹ and R² are similar and dissimilar lower alkyl radicals and X¹ is halogen.

3. A compound of the formula:

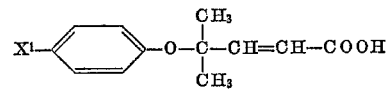

wherein X¹ is halogen.

4. Ethyl 4 - (4-chlorophenoxy) - 4 - methyl-2-pentenoate.

5. 4-(4-chlorophenoxy-4-methyl-2-pentenoic acid.
6. 4-(3-trifluoromethylphenoxy)-4-methyl-2-pentenoic acid.
7. 4-(4-methylphenoxy)-2,4-dimethyl-2-pentenoic acid.
8. 4-(4-methoxyphenoxy)-4-methyl-2-hexenoic acid.
9. 4-(4-chlorophenoxy)-2,4-dimethyl-2-hexenoic acid.

References Cited

UNITED STATES PATENTS

| | | | |
|---|---|---|---|
| 3,262,850 | 6/1966 | Jones et al. | 260—473 |
| 2,602,090 | 7/1952 | Dosser | 260—521 |

OTHER REFERENCES

Roberts and Caserio: "Organic Chemistry," Benjamin, New York, 1964, p. 1214.

Morrison and Boyd: "Organic Chemistry," Allyn and Bacon, Boston, 1959, p. 484.

LORRAINE A. WEINBERGER, *Primary Examiner.*

D. STENZEL, *Assistant Examiner.*

U.S. Cl. X.R.

260—294, 295, 501.1, 501.16, 516, 520, 521, 559; 424—308, 317, 324